United States Patent
Nagao et al.

(10) Patent No.: US 10,783,096 B2
(45) Date of Patent: Sep. 22, 2020

(54) STORAGE SYSTEM AND METHOD OF CONTROLLING I/O PROCESSING

(71) Applicant: HITACHI, LTD., Tokyo (JP)

(72) Inventors: Takashi Nagao, Tokyo (JP); Tomohiro Yoshihara, Tokyo (JP); Kohei Tatara, Tokyo (JP); Miho Kobayashi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 22 days.

(21) Appl. No.: 16/117,092

(22) Filed: Aug. 30, 2018

(65) Prior Publication Data

US 2019/0286583 A1    Sep. 19, 2019

(30) Foreign Application Priority Data

Mar. 19, 2018   (JP) .................................. 2018-051462

(51) Int. Cl.
   *G06F 3/00*      (2006.01)
   *G06F 13/16*     (2006.01)
   *G06F 13/10*     (2006.01)

(52) U.S. Cl.
   CPC ........ *G06F 13/1668* (2013.01); *G06F 13/102* (2013.01)

(58) Field of Classification Search
   CPC ..... G06F 13/00; G06F 13/1668; G06F 13/102
   USPC ............................... 710/5, 74, 100; 711/150
   See application file for complete search history.

(56) References Cited

U.S. PATENT DOCUMENTS

| | | | | |
|---|---|---|---|---|
| 6,295,575 | B1 * | 9/2001 | Blumenau | G06F 3/0622 711/153 |
| 2002/0103889 | A1 * | 8/2002 | Markson | H04L 67/1097 709/223 |
| 2004/0103254 | A1 * | 5/2004 | Satoyama | G06F 3/0613 711/150 |

(Continued)

FOREIGN PATENT DOCUMENTS

| | | |
|---|---|---|
| JP | 2005-267545 A | 9/2005 |
| JP | 2008-269424 A | 11/2008 |

(Continued)

OTHER PUBLICATIONS

Notice of Reasons for Refusal, dated Jun. 23, 2020, which issued during the prosecution of Japanese Application No. 2018-051462, which corresponds to the present application (English translation attached).

*Primary Examiner* — Tim T Vo
*Assistant Examiner* — Kim T Huynh
(74) *Attorney, Agent, or Firm* — Baker Botts L.L.P.

(57) ABSTRACT

A storage system provides a logical volume to a computer, manages the logical volume and a port receiving an I/O request for the logical volume in correspondence with each other, and holds assigned processor management information for managing correspondence between a processor for executing I/O processing based on an I/O request accumulated in a queue and an assigned port being a port corresponding to the queue. The processor identifies an assigned port on the basis of the assigned processor management information, executes I/O processing for the logical volume corresponding to the assigned port, and executes I/O processing on the basis of an I/O request received via the assigned port corresponding to another operation core.

10 Claims, 8 Drawing Sheets

(56) References Cited

U.S. PATENT DOCUMENTS

| | | | |
|---|---|---|---|
| 2005/0210188 A1* | 9/2005 | Mizuno | G06F 3/0605 |
| | | | 711/112 |
| 2008/0126581 A1* | 5/2008 | Komikado | G06F 3/061 |
| | | | 710/5 |
| 2008/0263190 A1 | 10/2008 | Serizawa et al. | |
| 2010/0325339 A1 | 12/2010 | Ogawa et al. | |
| 2011/0167232 A1 | 7/2011 | Takada et al. | |
| 2013/0166797 A1* | 6/2013 | Komikado | G06F 3/0611 |
| | | | 710/74 |
| 2014/0258608 A1* | 9/2014 | Viswanatha | G06F 12/0873 |
| | | | 711/113 |

FOREIGN PATENT DOCUMENTS

| | | |
|---|---|---|
| JP | 2011-530728 A | 12/2011 |
| JP | 2012-514776 A | 6/2012 |

* cited by examiner

FIG. 3

| HOST I/F ID 301 | HOST I/F TYPE 302 | PORT ID 303 | QUEUE LOCK STATE 304 | I/O REQUEST LIST 122 / 305 | | |
|---|---|---|---|---|---|---|
| | | | | USE STATE 311 | CORE ID 312 | PROCESS ID 313 |
| 1 | 8G Fibre Channel | 1 | LOCKED | USED | 0x01 | 0x1111 |
| | | | | UNUSED | N/A | N/A |
| | | 2 | UNLOCKED | USED | 0x15 | 0x1111 |
| | | | | USED | 0x12 | 0x1111 |
| | | 3 | UNLOCKED | UNUSED | N/A | N/A |
| | | | | UNUSED | N/A | N/A |
| | | 4 | UNLOCKED | UNUSED | N/A | N/A |
| | | | | UNUSED | N/A | N/A |

FIG. 4

| HOST I/F ID (401) | PORT ID (402) | I/O LOAD (403) | PROCESSOR ID (404) | CORE ID (405) |
|---|---|---|---|---|
| 1 | 1 | 20 | 1 | 1 |
| | 2 | 10 | 1 | 2 |
| | 3 | 20 | 2 | 1 |
| | 4 | 40 | 2 | 2 |

STORAGE SYSTEM AND METHOD OF CONTROLLING I/O PROCESSING

CLAIM OF PRIORITY

The present application claims priority from Japanese patent application JP 2018-051462 filed on Mar. 19, 2018, the content of which is hereby incorporated by reference into this application.

BACKGROUND OF THE INVENTION

1. Field of the Invention

The present invention relates to a technique for achieving high-speed I/O processing of a storage system.

2. Description of the Related Art

In storage systems, high speed I/O processing is required. In order to achieve high-speed I/O processing, a system configuration in which a plurality of processors are mounted in a storage system is adopted.

However, in a storage system in which a plurality of processors are mounted, since a plurality of processors share a memory, there is a problem that high-speed I/O processing is not fully performed due to occurrence of access competition or the like.

A technique described in JP 2005-267545 A is known to solve the above-mentioned problem. JP 2005-267545 A discloses "a storage system including disks, and a disk controller receiving a request from a higher-level device and controlling input/output of data to/from the disks, where the disk controller includes a plurality of processors, a plurality of memories each of which stores an operating program of the storage system, a plurality of higher-level interfaces each of which controls input/output of data from/to the higher-level device, and a plurality of lower-level interfaces each of which controls input/output of data to/from the disk, where each of the plurality of memories, each of the plurality of higher-level interfaces, and each of the plurality of lower-level interfaces are provided for exclusive use for each of the processors, and each of the plurality of processors accesses the memory dedicated for exclusive use to execute the operating program, and controls the higher-level interface and lower-level interface dedicated for exclusive use to perform input/output processing requested from the higher-level device".

SUMMARY OF THE INVENTION

In the technique of JP 2005-267545 A, it is necessary to provide a dedicated memory and interface for each processor. Further, in application of the technique of JP 2005-267545 A, it is necessary to divide a cache storage area shared between the plurality of processors into dedicated areas for the respective processors. Therefore, there is a problem that the operation cost such as hardware cost and management cost is high.

An object of the present invention is to achieve high-speed I/O processing while suppressing operation cost.

A representative example of the invention disclosed in the present application has the following configuration. A storage system for providing a storage area to a computer includes a plurality of storage media configured to store data, and a plurality of controllers. The controllers each include an interface having a plurality of ports connected to the computer and receiving an I/O request to the storage media, a memory configured to store a plurality of queues each accumulating an I/O request received by each of the plurality of ports, and a plurality of processors each having a plurality of operation cores configured to execute I/O processing based on the I/O request and a cache memory configured to store data related to the I/O processing. The storage system generates a logical volume from storage areas of the plurality of storage media and provides the logical volume to the computer, and manages the logical volume and a port configured to receive an I/O request for the logical volume in correspondence with each other. The memory stores assigned processor management information for managing correspondence between each of the processors configured to execute I/O processing based on the I/O request accumulated in each of the queues and an assigned port being a port corresponding to the queue. The processor identifies the assigned port on the basis of the assigned processor management information, acquires the I/O request received via the assigned port and accumulated in a queue corresponding to the assigned port, executes I/O processing for the logical volume corresponding to the assigned port while storing data related to the acquired I/O request in the cache memory, and controls execution of I/O processing based on an I/O request received via the assigned port corresponding to another operation core, on the basis of the assigned processor management information and usage rate of the processor.

According to the present invention, data related to a specific I/O request is controlled so as to be stored in the cache memory in the processor with reduced cost. Therefore, since access to the memory associated with I/O processing decreases, high-speed I/O processing can be achieved. Problems, configurations, and effects other than those described above will become apparent from the following description of embodiments.

BRIEF DESCRIPTION OF THE DRAWINGS

FIG. 3 is a table illustrating an example of a data structure of I/O request management information according to the first embodiment;

FIG. 4 is a table illustrating an example of a data structure of assigned processor management information according to the first embodiment;

DESCRIPTION OF THE PREFERRED EMBODIMENTS

Figure 1:
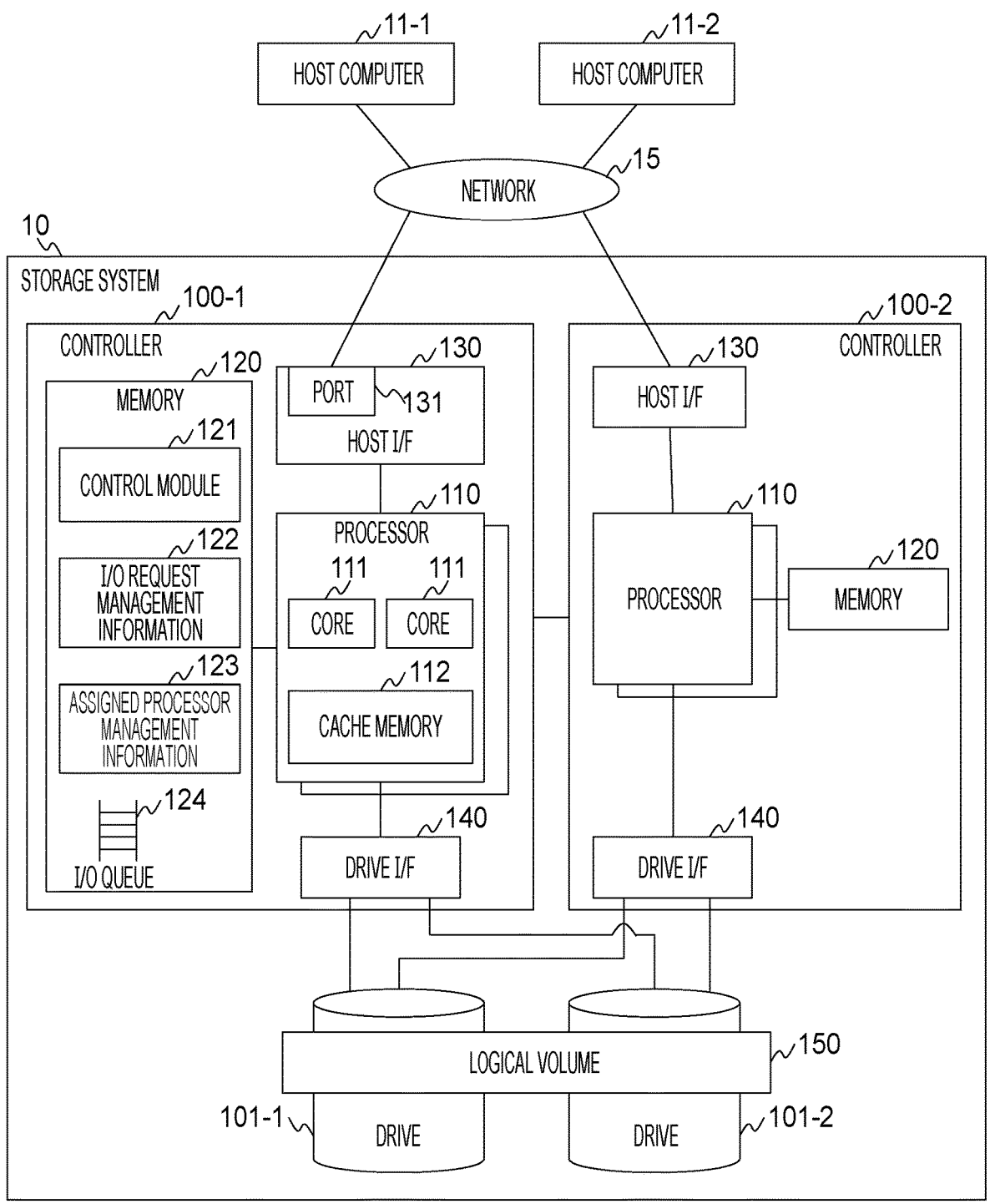
FIG. 1 is a diagram illustrating a configuration example of a computer system according to a first embodiment.

Embodiments of the present invention are hereinafter described with reference to the drawings. However, the present invention is not construed as being limited to the description of the embodiments described below. Those skilled in the art can easily understand that specific configurations can be changed without departing from the spirit and scope of the present invention.

In the configuration of the invention described below, the same or like configurations or functions are denoted by the same reference numerals, and redundant description will be omitted.

The notations such as "first", "second", "third", and the like in this specification and the like are provided to identify constituent elements, and do not necessarily limit the number or order thereof.

The positions, sizes, shapes, ranges, and the like of the respective constituent components illustrated in the drawings and the like do not necessarily represent actual positions, sizes, shapes, ranges, and the like, for ease of understanding of the invention. Accordingly, the present invention is not limited to the positions, sizes, shapes, ranges, and the like disclosed in the drawings and the like.

First Embodiment

FIG. 1 is a diagram illustrating a configuration example of a computer system according to a first embodiment.

The computer system includes a storage system 10 and a plurality of host computers 11-1 and 11-2. In the following description, when the host computers 11-1 and 11-2 are not distinguished from each other, the host computers 11-1 and 11-2 are referred to as host computers 11.

Each of the host computers 11 is connected to the storage system 10 via a network 15. The network 15 may include a storage area network (SAN), a local area network (LAN), a wide area network (WAN), or the like. Wired connection or wireless connection to the network 15 may be employed.

The host computer 11 is a computer including a processor, a memory, and a network interface, which are not illustrated. The host computer 11 executes predetermined processing using a storage area provided from the storage system 10.

The storage system 10 provides a storage area for each host computer 11. The storage system 10 includes a plurality of controllers 100-1 and 100-2, and a plurality of drives 101-1 and 101-2. In the following description, when the controllers 100-1 and 100-2 are not distinguished from each other, the controllers 100-1 and 100-2 are referred to as controllers 100, and when the drives 101-1 and 101-2 are not distinguished from each other, the drives 101-1 and 101-2 are described as drives 101.

Each of the controllers 100 controls I/O processing between the host computer 11 and the drive 101. The controller 100 includes a plurality of processors 110, a memory 120, a host interface 130, and a drive interface 140. The respective hardware configurations of the controller 100 are connected to each other via an internal bus. In the first embodiment, although the controller 100 includes one memory 120, host interface 130, and drive interface 140, two or more memories 120, host interfaces 130, and drive interfaces 140 may be included.

The controller 100-1 and the controller 100-2 are connected to each other via a dedicated path. Therefore, a processor 110 and a direct memory access (DMA) circuit which is not illustrated, included in the controller 100-1 can access the memory 120 of the controller 100-2 via the path. Similarly, the controller 100-2 can access the memory 120 of the controller 100-1 via the path.

Each of the processor 110 is an arithmetic device for executing a program stored in the memory 120. The processor 110 includes a plurality of cores 111 and a cache memory 112.

The memory 120 is a storage device for storing programs executed by the processor 110 and data used for the program. The programs and data stored in the memory 120 will be described later.

The host interface 130 is an interface for connection to the host computer 11 via the network 15. The host interface 130 is, for example, a network interface card (NIC) or a host bus adapter (HBA). The host interface 130 has a plurality of ports 131. When receiving an I/O request via a port 131, the host interface 130 according to the first embodiment stores the I/O request in a specific area (I/O queue 124) of the memory 120.

The drive interface 140 is an interface for connection to the drive 101.

The drive 101 is a storage device such as a hard disk drive (HDD) or a solid state drive (SSD).

The controller 100 generates a logical volume 150 by using a storage area of one or more drives 101 or a storage area of a redundant array of independent disks (RAID) group configured using a plurality of drives 101. The logical volume 150 is a storage area provided to each host computer 11, and managed corresponding to each port 131. A plurality of logical volumes 150 may be provided to the host computer 11.

Programs and data stored in the memory 120 will now be described. The memory 120 stores programs achieving a control module 121, and stores I/O request management information 122 and assigned processor management information 123. The memory 120 also stores the I/O queue 124 for accumulating I/O requests received by the respective ports 131.

The control module 121 controls the whole storage system 10. More specifically, the control module 121 performs management of the logical volume 150, control of I/O processing, and the like.

The I/O request management information 122 is information for managing I/O processing based on an I/O request received from the host computer 11. Details of a data structure of the I/O request management information 122 will be described with reference to FIG. 3.

The assigned processor management information 123 is information for managing a processor for executing I/O processing based on an I/O request received by a port 131. Details of a data structure of the assigned processor management information 123 will be described with reference to FIG. 4.

The memory 120 stores information for managing the storage system 10 not illustrated. For example, information for managing a hardware configuration, information for managing a correspondence between a port 131 and the logical volume 150, information for managing a relationship between the logical volume 150 and the RAID group, and the like are stored in the memory 120.

Figure 2:
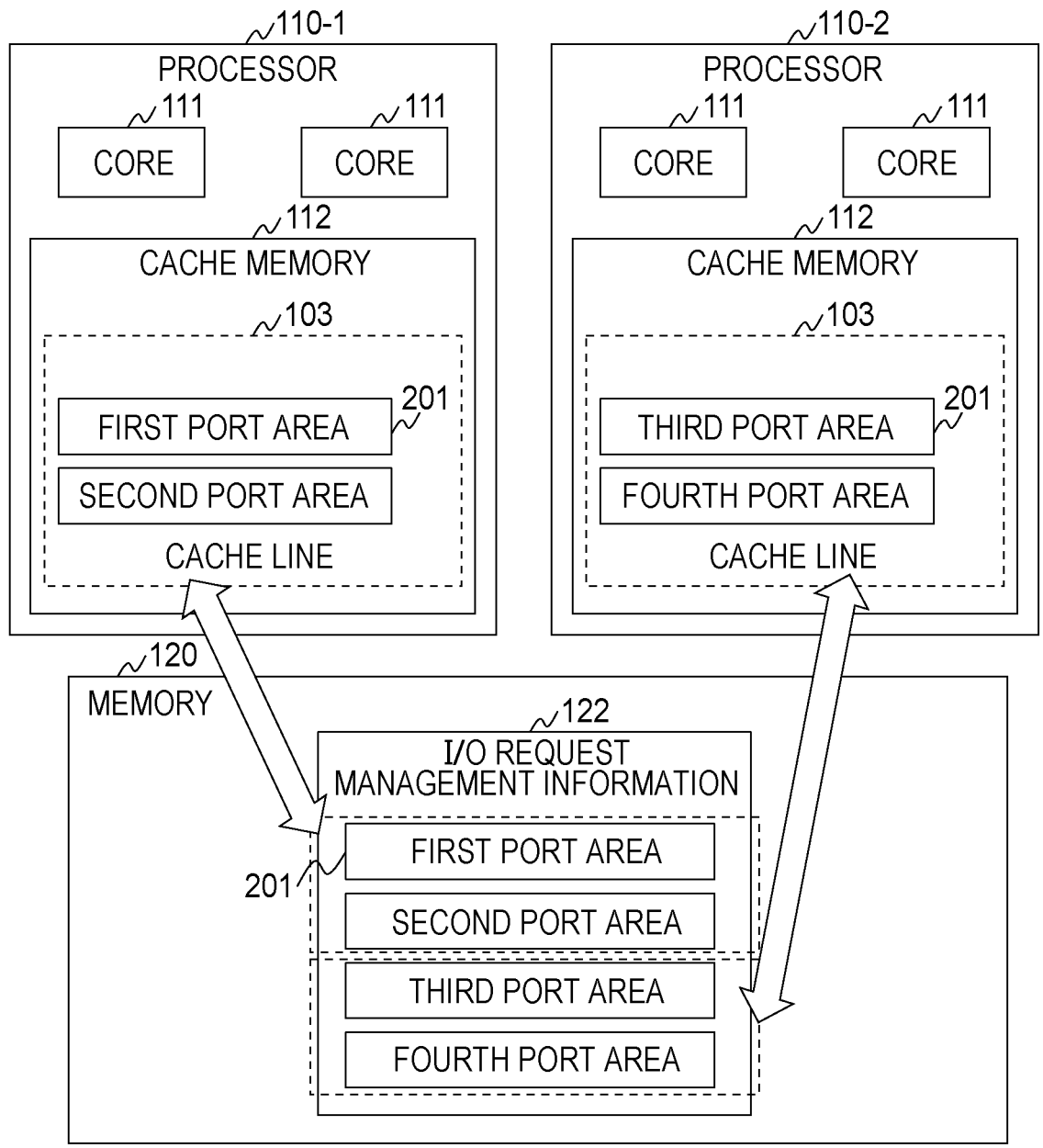
FIG. 2 is a diagram illustrating the concept of I/O processing in a storage system according to the first embodiment.

FIG. 2 is a diagram illustrating the concept of I/O processing in the storage system 10 according to the first embodiment.

As will be described later, the control module 121 according to the first embodiment sets a processor 110 for executing I/O processing, for a plurality of I/O queues 124 (a plurality of ports 131) included in each controller 100. That is, the control module 121 allocates the processors 110 assigned to the ports 131. Specifically, the control module 121 generates the assigned processor management information 123, and sets the assigned processor management information 123 in the memory 120.

In an example illustrated in FIG. 2, the processor 110-1 is set to execute I/O processing based on I/O requests accumulated in the I/O queues 124 corresponding to assigned first port 131 and second port 131. Furthermore, the processor 110-2 is set to execute I/O processing based on I/O requests accumulated in the I/O queues 124 corresponding to assigned third port 131 and fourth port 131.

Therefore, the processor 110-1 executes I/O processing for the logical volume 150 corresponding to each of the first port 131 and the second port 131, and the processor 110-2 executes I/O processing for the logical volume 150 corresponding to each of the third port 131 and the fourth port 131.

At this time, information stored in a first port area 201 and a second port area 201 of the I/O request management information 122 are accumulated in the cache memory 112 of the processor 110-1. Each port area 201 is an area for storing data related to I/O processing based on an I/O request received via a port 131, and corresponds to, for example, an entry of tabular information. That is, in the cache memory 112, data related to I/O processing for a specific logical volume 150 is accumulated. Therefore, since a cache hit rate of the cache memory 112 associated with I/O processing is increased, the number of accesses to the memory 120 decreases.

Since access to the memory 120 in I/O processing is part of the reason for a reduction in the processing speed, a decrease in the number of accesses to the memory 120 enables high-speed I/O processing.

In the control method according to the present embodiment, it is not necessary to provide dedicated hardware for the processor 110, and there is no need to divide the area of the memory 120. Therefore, it is possible to achieve high-speed I/O processing with reduced operation costs.

FIG. 3 is a table illustrating an example of the data structure of the I/O request management information 122 according to the first embodiment.

The I/O request management information 122 includes entries including a host interface ID 301, a host interface type 302, a port ID 303, a queue lock state 304, and an I/O request list 305. In one entry, information on one host interface 130 is stored.

The host interface ID 301 is a field for storing identification information of the host interface 130.

The host interface type 302 is a field for storing a value indicating the type of the host interface 130. In the host interface type 302, a product name, an interface standard, and the like are stored.

The port ID 303 is a field for storing identification information of the ports 131 of the host interface 130. In one entry, rows as many as the ports 131 of the host interface 130 are included.

The queue lock state 304 is a field for storing a value indicating a lock state of an I/O queue 124 for accumulating I/O requests received via a port 131 corresponding to a port ID 303. In the queue lock state 304, either "locked" indicating that the lock has been acquired or "unlocked" indicating that the lock has not been acquired is stored.

The I/O request list 305 is a field group for managing I/O processing based on an I/O request received by the processor 110 via the I/O queue 124. The I/O request list 305 includes a use state 311, a core ID 312, and a process ID 313.

The use state 311 is a field for storing a value indicating the use state of a row of the I/O request list 305. Either "used" or "unused" is stored in the use state 311. When managing I/O processing using the row, the use state 311 is updated from "unused" to "used". The core ID 312 is a field for storing identification information of a core 111 for executing the I/O processing based on the I/O request. The process ID 313 is a field for storing identification information of a process corresponding to the I/O processing.

FIG. 4 is a table illustrating an example of the data structure of the assigned processor management information 123 according to the first embodiment.

The assigned processor management information 123 includes entries including a host interface ID 401, a port ID 402, an I/O load 403, a processor ID 404, and a core ID 405. In one entry, information on one host interface 130 is stored.

The host interface ID 401 and the port ID 402 are the same fields as the host interface ID 301 and the port ID 303.

The I/O load 403 is a field for storing a value indicating an I/O load of a port 131 corresponding to the port ID 402.

The processor ID 404 is a field for storing identification information of a processor 110 including a core 111 assigned to a port 131. The core ID 405 is a field for storing identification information of a core 111 assigned to a port 131. That is, the core ID 405 is information for identifying a core 111 for executing I/O processing based on an I/O request stored in an I/O queue 124 from a port 131 corresponding to the port ID 402.

Figure 5:
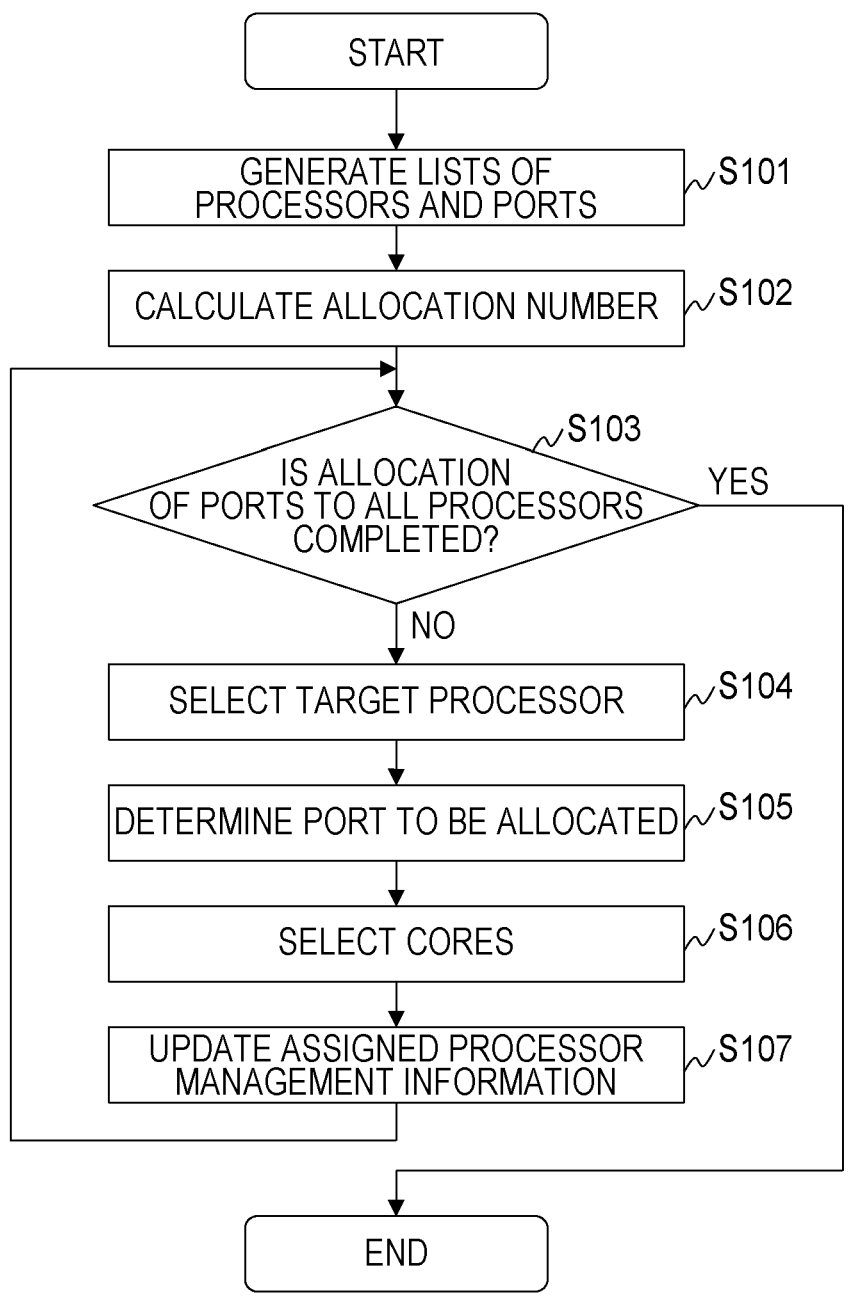
FIG. 5 is a flowchart illustrating an example of a process of generating assigned processor management information executed by the storage system according to the first embodiment.

FIG. 5 is a flowchart illustrating an example of a process of generating the assigned processor management information 123 executed by the storage system 10 according to the first embodiment.

The process of generating the assigned processor management information 123 is executed before operation of the storage system 10. A control module 121 achieved by a processor 110 included in each controller 100 executes the process of generating the assigned processor management information 123 stored in a memory 120 of each controller 100.

The control module 121 refers to information for managing a hardware configuration and generates lists of processors 110 and ports 131 included in a controller 100 (step S101). At this time, the control module 121 stores initialized assigned processor management information 123 in the memory 120.

Next, the control module 121 calculates the number (allocation number) of ports 131 to be allocated to each processor 110 included in the controller 100 (step S102).

Specifically, the control module 121 calculates the allocation number by dividing the number of ports 131 by the number of processors 110. The method of calculating the allocation number described above is by way of example and is not limited thereto.

Next, the control module 121 determines whether allocation of the ports 131 to all processors 110 included in the controller 100 has been completed (step S103).

When it is determined that the allocation of the ports 131 is completed, the control module 121 finishes the process of generating the assigned processor management information 123.

When it is determined that the allocation of the ports 131 is not completed, the control module 121 selects a target processor 110 from the list of the processors 110 (step S104), and determines a port 131 to be allocated to the target processor 110 (step S105).

Specifically, the control module 121 selects ports 131 as many as the allocation number from the list of ports 131. At this time, the selected ports 131 are deleted from the list of ports 131.

Next, the control module 121 selects cores 111 assigned to the determined ports 131, from cores 111 included in the target processor 110 (step S106). For example, the control module 121 selects cores 111 in a round robin manner. The present invention is not limited to this method of selecting the core 111.

Next, the control module 121 updates the assigned processor management information 123 (step S107), and then returns to step S103. Specifically, the following processing is executed.

The control module 121 adds an entry to the assigned processor management information 123 and sets identification information of the host interface 130 included in a controller 100, for the host interface ID 401 of the added entry.

The control module 121 generates rows as many as the selected ports 131, in the added entry. The control module 121 sets identification information of the selected ports 131 for the port ID 402 in the generated rows, and sets identification information of the target processor 110 for the processor ID 404 in the generated rows. Further, the control module 121 sets identification information of the selected cores 111 for the core ID 405 in the generated rows. At this time point, an initial value such as "0" is set to the I/O load 403 of the generated rows. This is the end of a description of the process of step S107.

When a plurality of host interfaces 130 is included in a controller 100, the process from step S101 to step S107 is executed for each host interface 130.

Figure 6:
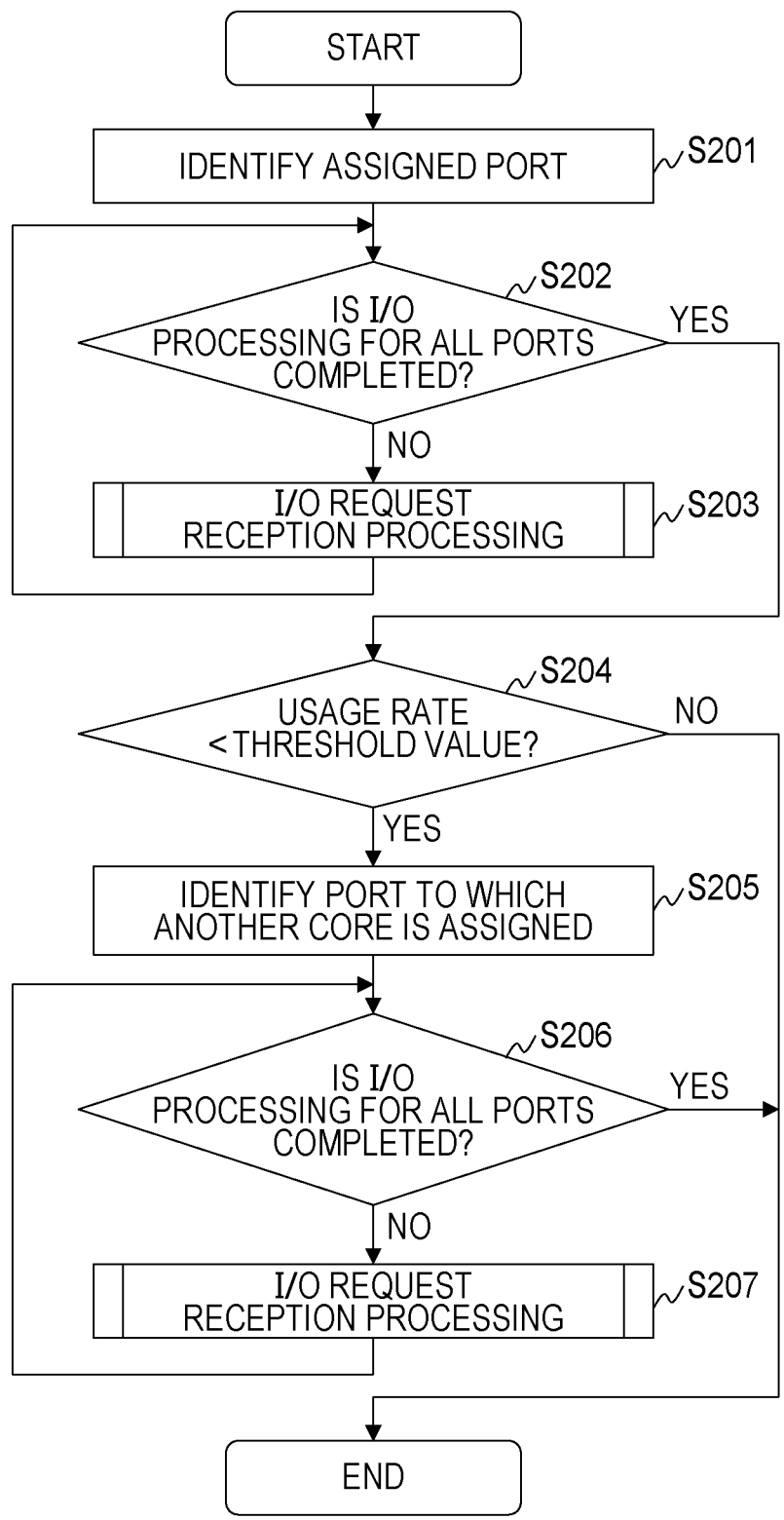
FIG. 6 is a flowchart illustrating an example of I/O control processing executed by the storage system according to the first embodiment.

FIG. 6 is a flowchart illustrating an example of I/O control processing executed by the storage system 10 according to the first embodiment. The I/O control processing described below is periodically executed by each of the plurality of processors 110. Execution cycles of the I/O control processing executed by the plurality of processors 110 may be the same or different. Furthermore, when the execution cycles of the I/O control processing are the same, the I/O control processing of the plurality of processors 110 may be synchronous or asynchronous.

A core 111 of a processor 110 refers to the assigned processor management information 123 stored in the memory 120 and identifies an assigned port 131 (step S201).

More specifically, the core 111 of the processor 110 searches for a row in which identification information of the processor 110 itself is set in the processor ID 404 of the assigned processor management information 123 and the identification information of the core 111 itself is set in the core ID 405. The core 111 of the processor 110 acquires identification information of a port 131 stored in the port ID 402 of the row searched for. The acquired identification information of the port 131 is stored in the cache memory 112.

Next, the core 111 of the processor 110 determines whether I/O request reception processing for all the identified ports 131 has been completed (step S202). Specifically, the following processing is executed.

When the process proceeds from step S201 to step S202, the core 111 of the processor 110 determines that I/O request reception processing for all the identified ports 131 has not been completed.

When the process proceeds from step S203 to step S202, the core 111 of the processor 110 refers to memory areas of I/O queues 124 corresponding to all the identified ports 131, and determines whether an unprocessed I/O request is stored.

When it is determined that at least one unprocessed I/O request is stored in any of the I/O queues 124 corresponding to all the specified ports 131, the core 111 of the processor 110 executes I/O request reception processing for an identified port 131 for which I/O request reception processing has not been completed (step S203). After a lapse of a certain period, the processor 110 returns to step S202. Details of the I/O request reception processing will be described with reference to FIG. 7.

When it is determined that the I/O request reception processing for all the specified ports 131 is completed, the core 111 of the processor 110 determines whether the usage rate of the core 111 itself is smaller than a threshold value (step S204). The usage rate is a ratio of a time period in which I/O processing is performed for a predetermined time period before determination time. The threshold value is preset. However, the threshold value can be updated at any time.

The usage rate is calculated, for example, by the following method. The core 111 acquires, as start time, time at which I/O processing is started or restarted, and acquires, as end time, time of transition to a waiting state or time at which the I/O processing ends. The core 111 adds time obtained by subtracting the start time from the end time, as an I/O processing time, to a counter of the memory 120. The core 111 refers to the counter at a constant interval (for example, one second interval), and calculates a proportion of the I/O processing as the usage rate. At this time, the core 111 clears the counter to "0".

When it is determined that the usage rate of the core 111 itself is equal to or greater than the threshold value, the core 111 of the processor 110 finishes the I/O control processing.

When it is determined that the usage rate of the core 111 itself is smaller than the threshold value, the core 111 of the processor 110 identifies a port 131 to which another core 111 is assigned (step S205).

Specifically, the core 111 of the processor 110 searches for a row in which the identification information of the processor 110 itself is set in the processor ID 404 and identification information of a core other than the core 111 itself is set in the core ID 405, and stores a list of the rows searched for, in the cache memory 112. When an appropriate row is not found in the processor 110 itself, the core 111 of the processor 110 searches for a row in which identification information of a processor other than the processor 110 itself is set in the processor ID 404 of the assigned processor management information 123, and a list of the rows searched for is stored in the cache memory 112. At this time, the core 111 of the processor 110 accesses a cache memory 112 of another processor 110 assigned to the port 131, and deletes port identification information indicating that the other processor 110 is assigned to the port 131. Accordingly, all the I/O processing of the port 131 is moved between the processors.

Next, the core 111 of the processor 110 determines whether the I/O request reception processing for all the ports 131 corresponding to the row searched for has been completed (step S206). Specifically, the following processing is executed.

The core 111 of the processor 110 determines whether the I/O request reception processing for the ports 131 corresponding to the rows searched for in step S205 has been completed. This processing is the same as the processing in step S202.

When it is determined that the I/O request reception processing for all the specified ports 131 corresponding to the rows searched for has not been completed, the processor 110 executes I/O request reception processing for a port 131 for which the I/O request reception processing has not been completed (step S207). After a lapse of a certain period, the processor 110 returns to step S206.

The core 111 of the processor 110 performs the process of step S201 to step S203 to execute only I/O processing for a specific logical volume 150. Accordingly, data related to the specific logical volume 150 is stored in the cache memory 112. Therefore, since the number of accesses to the memory 120 decreases, high-speed I/O processing can be achieved.

The core 111 of the processor 110 performs the process of step S204 to step S207 to execute I/O processing for a port 131 assigned to another core 111 in the processor 110, when the usage rate of the core 111 of the processor 110 is low. This makes it possible to effectively utilize the resources of the storage system 10. In the cache memory 112, data related to a specific logical volume 150 processed by another core 111 included in the same processor 110 is stored. Therefore, since the number of accesses to the memory 120 decreases, high-speed I/O processing can be achieved.

Figure 7:
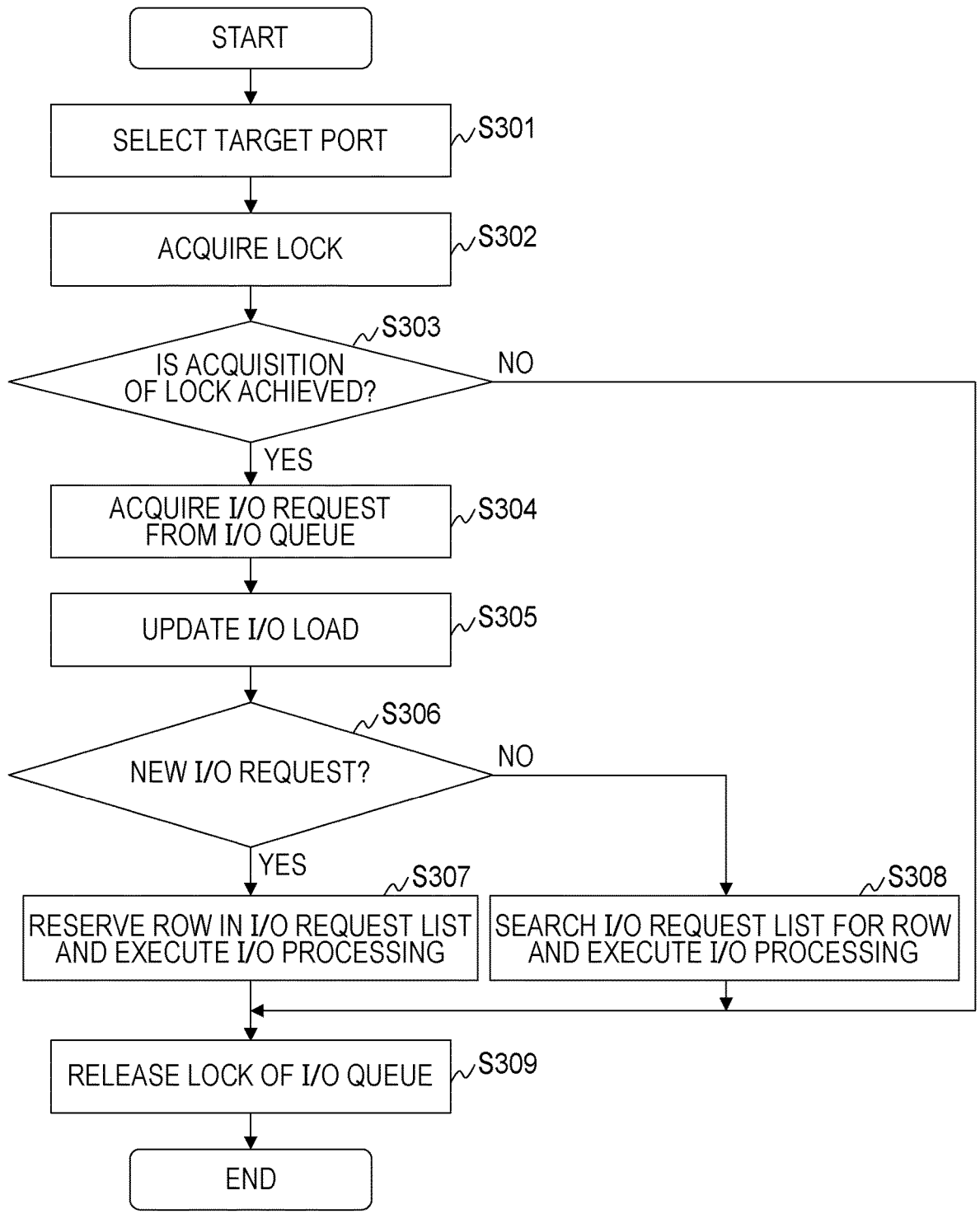
FIG. 7 is a flowchart illustrating an example of I/O request reception processing executed by the storage system according to the first embodiment.

FIG. 7 is a flowchart illustrating an example of I/O request reception processing executed by the storage system 10 according to the first embodiment.

A core 111 of a processor 110 selects a target port 131 from among ports 131 that have been identified and for which I/O request reception processing have not been completed (step S301).

Next, the core 111 of the processor 110 acquires a lock of an I/O queue 124 corresponding to the target port 131 (step S302). Furthermore, the core 111 of the processor 110 determines whether acquisition of the lock is achieved (step S303). Specifically, the following processing is executed.

The core 111 of the processor 110 refers to the I/O request management information 122, searches for an entry in which identification information of a host interface 130 including the processor 110 itself is stored in the host interface ID 301, and searches for a row in which identification information of the target port 131 is stored in the port ID 303, from the entry searched for. The core 111 of the processor 110 determines whether the queue lock state 304 of the row searched for is "unlocked".

When the queue lock state 304 of the row searched for is "locked", the core 111 of the processor 110 determines that acquisition of a lock ends in failure.

When the queue lock state 304 of the row searched for is "unlocked", the core 111 of the processor 110 acquires a lock. When acquisition of a lock is performed normally, the core 111 of the processor 110 determines that acquisition of the lock is achieved. At this time, the core 111 of the processor 110 sets "locked" for the queue lock state 304 in the row searched for.

When acquisition of the lock is not performed normally, the core 111 of the processor 110 determines that acquisition of the lock ends in failure. This is the end of a description of the process of step S302 and step S303.

When it is determined that the acquisition of the lock ends in failure, the core 111 of the processor 110 finishes I/O request reception processing.

When it is determined that the acquisition of the lock is achieved, the core 111 of the processor 110 acquires an I/O request from the I/O queue 124 corresponding to the target port 131 (step S304), and further calculates a load of I/O processing based on the I/O request (Step S305). For example, the load of I/O processing may be calculated on the basis of the type of the I/O processing, an amount of data to be handled, or the like or usage rate of the core 111 of the processor 110 may be calculated as a load by using a monitoring function.

At this time, the core 111 of the processor 110 refers to the assigned processor management information 123, and searches for a row in which identification information of the processor 110 itself is stored in the processor ID 404, the identification information of the core 111 itself is stored in the core ID 405, and the identification information of the target port 131 is stored in the port ID 402. The core 111 of the processor 110 adds the calculated load to the I/O load 403 in the row searched for.

Next, the core 111 of the processor 110 determines whether the acquired I/O request is a new I/O request (step S306). Whether the acquired I/O request is a new I/O request can be determined on the basis of the type, a command, and the like of the acquired I/O request. In a case in which the acquired I/O request is an I/O request indicating a response to I/O processing corresponding to writing of data, it is determined that the acquired I/O request is not a new I/O request.

When it is determined that the acquired I/O request is a new I/O request, the core 111 of the processor 110 updates a row of the I/O request management information 122 corresponding to the target port 131, further generates a process of I/O processing based on the acquired I/O request, and starts the process (step S307). Then, the core 111 of the processor 110 proceeds to step S309. Specifically, the following processing is executed.

The core 111 of the processor 110 searches for an entry in which the identification information of the host interface 130 including the processor 110 itself is stored in the host interface ID 301. The core 111 of the processor 110 searches for a row in which the identification information of the target port 131 is stored in the port ID 303 of the entry searched for. The core 111 of the processor 110 refers to the I/O request list 305 of the row searched for and searches for one row whose use state 311 is "unused". The core 111 of the processor 110 sets "used" for the use state 311 of the row searched for.

The core 111 of the processor 110 generates a process and sets the process to a ready state. At this time, the core 111 of the processor 110 sets the identification information for the core 111 for the core ID 312 in the row searched for, and sets the identification information of the generated process for the process ID 313 in the row searched for. The generated process is executed on the basis of process scheduling of the core 111 of the processor 110.

When communication with a host computer 11 is required during the execution of I/O processing, the core 111 of the processor 110 transmits an I/O request to the host computer 11 via a port 131, and changes the state of the process to a response waiting state. At this time, the core 111 of the processor 110 adds information for identifying the process, to the I/O request transmitted.

For example, in I/O processing for reading data, the core 111 of the processor 110 stores data to be read in the memory 120, and then transmits the I/O request to respond the stored data to the host computer 11. The information for identifying the process may be, for example, the core ID 312 and the process ID 313 or may be the number of rows from the head of the I/O request list 305.

When it is determined that the acquired I/O request is not a new I/O request, the core 111 of the processor 110 refers to the I/O request list 305, searches for a row in which the core ID 312 and the process ID 313 correspond to the identification information of the core 111 itself and the identification information of the process of the I/O request, and changes the state of the process from the response waiting state to a ready state (step S308). Then, the core 111 of the processor 110 proceeds to step S309. Specifically, the following processing is executed.

The core 111 of the processor 110 searches for an entry in which the identification information of the host interface 130 including the processor 110 itself is stored in the host interface ID 301. The core 111 of the processor 110 searches for a row in which the identification information of the target port 131 is stored in the port ID 303 of the entry searched for. The core 111 of the processor 110 refers to the I/O request list 305 of the row searched for and searches for a row corresponding to the acquired I/O request.

Furthermore, the core 111 of the processor 110 changes the state of a process identified by the core ID 312 and the process ID 313 of the row searched for, to the ready state. The process is configured so that processing is restarted on the basis of the process scheduling of the core 111 of the processor 110, and after I/O processing is completed, the core 111 of the processor 110 initializes the use state 311, the core ID 312, and the process ID 313 of a corresponding row of the I/O request management information 122. Specifically, the core 111 of the processor 110 sets "unused" for the use state 311 and "N/A" for the core ID 312 and the process ID 313.

The core 111 of the processor 110 notifies a core 111 corresponding to the identification information stored in the core ID 312 of the row searched for of the acquired I/O request. This is the end of a description of the process of step S308.

In step S309, the core 111 of the processor 110 releases the acquired lock (step S309). Thereafter, the core 111 of the processor 110 finishes the I/O request reception processing. At this time, the core 111 of the processor 110 changes the queue lock state 304 to "unlocked".

As described above, according to the first embodiment, I/O requests received via a specific port 131 tend to gather so as to be executed by a specific processor 110. Accordingly, in a cache memory 112 shared between the cores 111 in the processor 110, data related to the logical volume 150 corresponding to the port 131 is stored. When the usage rate of the core 111 is lowered, a port 131 assigned to another core 111 in the same processor 110 is preferentially assigned. Accordingly, since the number of accesses to the memory 120 during execution of I/O processing can be reduced, high-speed I/O processing can be achieved. In addition, when the usage rate of all the cores 111 in a processor 110 is lowered, I/O request reception processing for a port 131 assigned to another processor 110 is executed, considering effective utilization of resources of the processor. At this time, all I/O requests from the port are moved between the processors, thereby effectively utilizing cache data.

In the first embodiment, it is assumed that one memory 120 is connected to a plurality of processors 110. However, the method described in the first embodiment can also be applied to a configuration other than those described above. For example, a plurality of memories 120 may be connected to a plurality of processors 110. In this case, the same control can be performed by handling storage areas of the plurality of memories 120 as one storage area.

Second Embodiment

In a second embodiment, a method of updating the assigned processor management information 123 will be described.

Since the configuration of the computer system and the configuration of the storage system 10 according to the second embodiment are the same as those of the first embodiment, description thereof will be omitted. Since a data structure of information held by the storage system 10 according to the second embodiment is the same as that of the first embodiment, description thereof is omitted.

Figure 8:
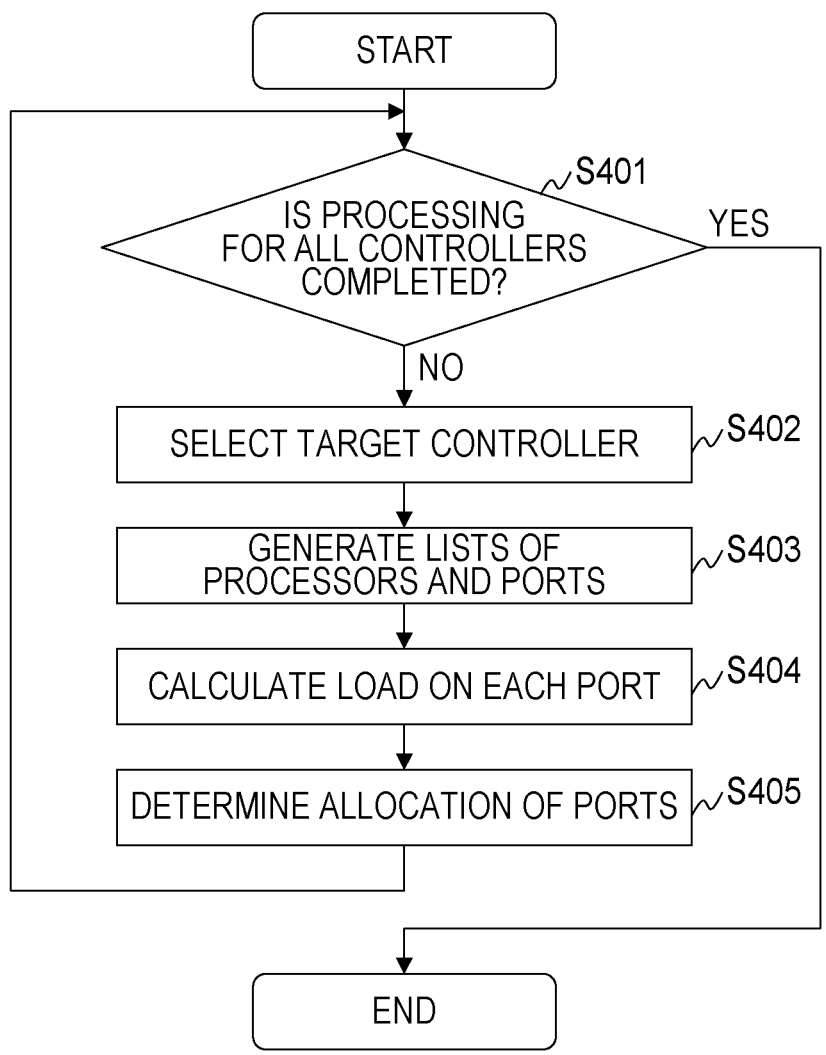
FIG. 8 is a flowchart illustrating an example of a process of updating assigned processor management information executed by a storage system according to a second embodiment.

FIG. 8 is a flowchart illustrating an example of a process of updating the assigned processor management information 123 executed by the storage system 10 according to the second embodiment.

The process of updating the assigned processor management information 123 is executed at any time after the storage system 10 is operated.

The control module 121 determines whether all of processing executed by a controller 100 has been completed (step S401).

When it is determined that all of processing executed by the controller 100 has been completed, the control module 121 finishes the process of updating the assigned processor management information 123.

When it is determined that all of processing executed by the controller 100 is not completed, the control module 121 refers to information for managing the hardware configuration and selects a target controller 100 (step S402).

Next, the control module 121 refers to the information for managing the hardware configuration and generates lists of processors 110 and ports 131 included in the target controller 100 (step S403).

Next, the control module 121 acquires a load on each port 131 of a host interface 130 included in the target controller 100 (step S404).

More specifically, the control module 121 refers to the assigned processor management information 123 and searches for an entry in which the host interface ID 401 having identification information matching identification information of the host interface 130 included in the target controller 100. The control module 121 obtains a value of the I/O load 403 of each row included in the entry searched for.

Next, the control module 121 determines a port 131 to be allocated to a core 111 of each processor 110 included in the target controller 100 (step S405). Thereafter, the control module 121 returns to step S401. In step S405, the following processing is executed.

On the basis of a data size of one cache line and a data size of one row (port area 201) of the I/O request list 305 of the I/O request management information 122, the control module 121 calculates the number of rows that can be included in one cache line. The calculated number of rows is described as a reference number.

The control module 121 sets the reference number as the minimum unit of the number of ports 131 to be allocated and determines allocation of the ports 131 where a difference between total values of loads on the ports 131 allocated to the core 111 of the processor 110 is the smallest.

The control module 121 refers to the assigned processor management information 123 and sets the determined identification information of the processor 110 and core 111, for the processor ID 404 and the core ID 405 in the entry corresponding to the host interface 130 included in the target controller 100. This is the end of a description of the process of step S405.

According to the second embodiment, ports 131 assigned to a core 111 of a processor 110 and the number of ports 131 can be dynamically changed according to a load on a port 131.

Note that the present invention is not limited to the above embodiments, and includes various modifications. Furthermore, for example, in the above embodiments, configurations are described in detail for ease of understanding the present invention, and therefore, the present invention is not necessarily limited to a configuration including all of the configurations described above. Still furthermore, addition, elimination, or substitution of part of the configurations of the respective embodiments, may be made with respect to another configuration.

In addition, the configurations, functions, processing units, processing means, and the like described above may be partially or wholly achieved by hardware, such as a designed integrated circuit. Furthermore, the present invention can be also achieved by program codes for software which achieve functions of the embodiments. In this configuration, a storage medium recording the program codes is provided to a computer, and a processor included in the computer reads the program codes stored in the storage medium. In this case, the program codes themselves read from the storage medium achieve the functions of the embodiments described above, and the program codes themselves and the storage medium storing the program codes constitute the present invention. For example, for the storage medium for supplying such program codes, a flexible disk, CD-ROM, DVD-ROM, hard disk, solid state drive (SSD), optical disk, magneto-optical disk, CD-R, magnetic tape, nonvolatile memory card, ROM, or the like is used.

In addition, a program code for achieving the functions described in the present embodiment can be implemented in a wide range of programs or script language, such as assembler, C/C++, perl, Shell, PHP, Java (registered trademark).

Furthermore, the program codes for software achieving the functions of the embodiments may be delivered via a network to be stored in storage means, such as a hard disk or a memory of a computer, or a storage medium, such as a CD-RW or a CD-R, and the program codes stored in the storage means or the storage medium may be read and executed by a processor of a computer.

In the above embodiments, control lines or information lines considered to be necessary for description are described, and not necessarily all the control lines or information lines required for a product are shown. All the configurations may be mutually connected.

What is claimed is:

1. A storage system for providing a storage area to a computer, the storage system comprising:
   a plurality of storage media configured to store data; and
   a plurality of controllers, each having a plurality of processors, wherein the controllers each include:
      an interface having a plurality of ports connected to the computer and receiving an I/O request to the storage media;
      a plurality of memory, each of which is connected to one of the plurality of controllers and shared by the plurality of processors included in a connected controller, configured to store a plurality of queues each accumulating an I/O request received by each of the plurality of ports; and
      the plurality of processors each having a plurality of operation cores configured to execute I/O processing based on the I/O request and a cache memory configured to store data related to the I/O processing,
   the storage system
      generates a logical volume from storage areas of the plurality of storage media, and provides the logical volume to the computer, and
      manages the logical volume and a port configured to receive an I/O request for the logical volume in correspondence with each other,
   the memory stores assigned processor management information for managing correspondence between each of the processors configured to execute I/O processing based on the I/O request accumulated in each of the queues and an assigned port being a port corresponding to the queue, and
   the processor
   identifies the assigned port on the basis of the assigned processor management information,
   acquires the I/O request received via the assigned port and accumulated in a queue corresponding to the assigned port,
   executes I/O processing for the logical volume corresponding to the assigned port while storing data related to the acquired I/O request in the cache memory, and
   controls execution of I/O processing based on an I/O request received via the assigned port corresponding to another processor included in a same controller, on the basis of the assigned processor management information and usage rate of the processor.

2. The storage system according to claim 1, wherein the assigned processor management information manages correspondence between an operation core of the processor and the assigned port, and
   an operation core of the processor
   controls execution of I/O processing based on an I/O request received via an assigned port corresponding to another operation core on the basis of the assigned processor management information, and
   in selection of an assigned port corresponding to the other operation core, selects an assigned port corresponding to another operation core in the same processor in priority to an assigned port corresponding to an operation core in another processor.

3. The storage system according to claim 2, wherein when controlling execution of I/O processing based on an I/O request received via an assigned port corresponding to an operation core of the other processor, an operation core of the processor releases correspondence between the operation core of the other processor and the assigned port.

4. The storage system according to claim 2, wherein when the queue corresponding to the assigned port has no I/O request received via the assigned port and a usage rate of the operation core is smaller than a threshold value, an operation core of the processor controls execution of I/O processing based on an I/O request received via an assigned port corresponding to the other operation core, on the basis of the assigned processor management information.

5. The storage system according to claim 1, wherein at least one of the processors
   calculates a load of I/O processing on each of the plurality of ports,
   changes allocation of the plurality of ports to the plurality of processors to reduce a difference between total values of loads on ports assigned to the processor, and
   updates the assigned processor management information on the basis of a result of changing the allocation.

6. A method of controlling I/O processing executed by a storage system configured to provide a storage area to a computer,
   the storage system including a plurality of storage media configured to store data, and a plurality of controllers, the controllers each including an interface having a plurality of ports connected to the computer and receiving an I/O request to the storage media, a plurality of memory configured to store a plurality of queues each accumulating an I/O request received by each of the plurality of ports, and a plurality of processors each having a plurality of operation cores configured to execute I/O processing based on the I/O request and a cache memory configured to store data related to the I/O processing, wherein the plurality of memory is each connected to one of the plurality of controllers and shared by the plurality of processors included in a connected controller, the storage system generating a logical volume from storage areas of the plurality of storage media and providing the logical volume to the computer, and managing the logical volume and a port configured to receive an I/O request for the logical volume in correspondence with each other, the memory storing assigned processor management information for managing correspondence between each of the processors configured to execute I/O processing based on the I/O request accumulated in each of the queues and an assigned port being a port corresponding to the queue, the method of controlling I/O processing comprising:

a first step of identifying the assigned port on the basis of the assigned processor management information by using the processor;

a second step of acquiring the I/O request received via the assigned port and accumulated in a queue corresponding to the assigned port by using the processor;

a third step of executing I/O processing for the logical volume corresponding to the assigned port while storing data related to the acquired I/O request in the cache memory by using the processor; and a fourth step of controlling execution of I/O processing based on an I/O request received via the assigned port corresponding to another processor included in a same controller, on the basis of the assigned processor management information and a usage rate of the processor by using the processor.

7. The method of controlling I/O processing according to claim 6, wherein the assigned processor management information manages correspondence between an operation core of the processor and the assigned port, the fourth step includes a fifth step of controlling execution of I/O processing based on an I/O request received via an assigned port corresponding to another operation core, on the basis of the assigned processor management information by using an operation core of the processor, and the fifth step includes selecting an assigned port corresponding to another operation core in the same processor in priority to an assigned port corresponding to an operation core in another processor, by using an operation core of the processor, when an assigned port corresponding to the other operation core is selected.

8. The method of controlling I/O processing according to claim 7, wherein the fifth step includes releasing correspondence between an operation core of the other processor and the assigned port, by using an operation core of the processor, when execution of I/O processing based on an I/O request received via an assigned port corresponding to an operation core of the other processor is controlled.

9. The method of controlling I/O processing according to claim 7, wherein the fifth step includes controlling execution of I/O processing based on an I/O request received via an assigned port corresponding to the other operation core, on the basis of the assigned processor management information, by using an operation core of the processor, when the queue corresponding to the assigned port has no I/O request received via the assigned port, and a usage rate of the operation core is smaller than a threshold value.

10. The method of controlling I/O processing according to claim 6, further comprising:

calculating a load of I/O processing of each of the plurality of ports by using the at least one processor;

changing allocation of the plurality of ports to the plurality of processors to reduce a difference between total values of loads on ports allocated to the processor, by using the at least one processor; and updating the assigned processor management information on the basis of a result of changing the allocation, by using the at least one processor.

* * * * *